TURNER, BESS & SLOAN.
Seed Planter.

No. 21,389.  Patented Aug. 31, 1858.

UNITED STATES PATENT OFFICE.

ALEX. TURNER, REDDEN BESS, AND HERVEY SLOAN, OF FRANKLIN, IND.

IMPROVEMENT IN SEEDING-MACHINES.

Specification forming part of Letters Patent No. 21,389, dated August 31, 1858.

*To all whom it may concern:*

Be it known that we, ALEXANDER TURNER, REDDEN BESS, and HERVEY SLOAN, of Franklin, in the county of Johnson and State of Indiana, have invented certain new and useful Improvements in Seeding-Plows; and we do hereby declare that the following is a full, clear, and exact description of the same, reference being had to the accompanying drawings, and to the letters of reference marked thereon.

The nature of our invention consists in the peculiar construction of our plow, and in arrangement with the seeding apparatus connected therewith, as is hereinafter described.

In order that those skilled in the arts may use and manufacture our invention, we will proceed to describe its construction and operation.

Figure 1:
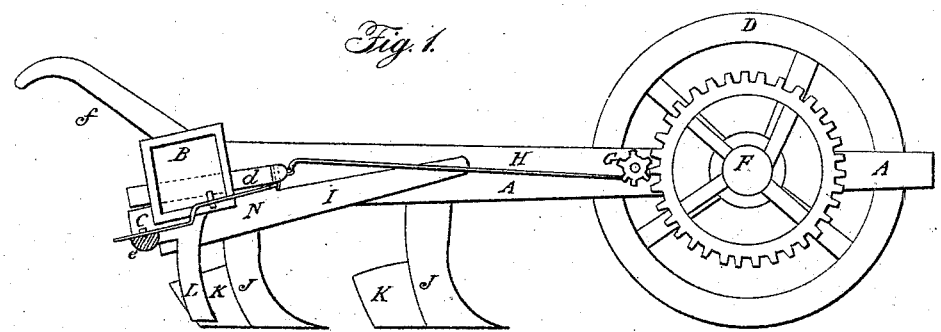
Figure 2:
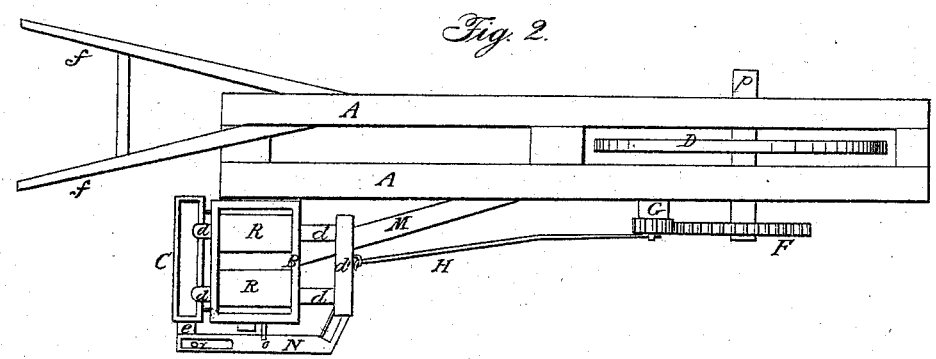
Figure 3:
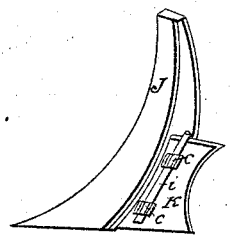

In the annexed drawings, Figure 1 is a side elevation. Fig. 2 is a plan view. Fig. 3 is a perspective view of the back of the plow.

In the several figures, A represents the frame of the machine. D is the driving-wheel, and is secured on shaft $p$. F is a cog-wheel, secured also to shaft $p$, and works into a pinion, G. A rod, H, connects this pinion with the piece $d'$, which connects the two seed-slides $d$ $d$ together. B is a seed-box, having two chambers, R R, in it, through which chambers the seed-slides $d$ $d$ pass. C is a smaller seed-box, located behind the box B, said box having a slide, $e$, which works in it, and carries out the seed. N is a lever connecting piece $d'$ with slide $e$. Said lever, working on a fulcrum at $r$, works the slide $e$ when the machine is in motion in a direction contrary to the slides $d$ $d$. J represents a plow-tooth, which is secured to the frame A. K is the mold-board, attached to said tooth. The tooth, as will be seen, has an opening behind, and in this opening is secured the loops $c$ $c$. These loops pass through a slot or slots in the mold-board, as seen in Fig. 3, and a pin, $i$, then passes through the loops, securing the mold-board firmly to the tooth. It is very evident that this mold-board may be removed and a different-sized one placed in its stead, or it may be lowered or elevated on the tooth and secured firmly by the pin $i$.

The plow so formed passes ahead of the seed-boxes, and is altered and changed to suit the different kinds of seed which it may be desirable to sow.

The mold-board may be removed, and then a small furrow only will be made, or the mold-boards may be secured in position and the ground will be turned over, and will make a deeper furrow or prepare the land for the seed, as may be desired.

It will be perceived that seed may be placed in each of the seed-boxes, or either of them, and that as the respective slides of each box are operated by the forward motion of the machine they will distribute the seed in the furrows made by the plows.

A machine constructed on the plan herein specified is a cheap and convenient farming implement. The arrangement of an adjustable plan, such as is described, with a cheap and easily-operated seeding apparatus has proved to be very desirable, useful, and economical to farmers planting different kinds of grain in different kinds of ground needing different treatment.

Having thus fully described our improvement, what we wish to secure by Letters Patent as new is—

The arrangement of the seed-boxes B and C, the seed-slides $d$ and $e$, rod H, wheels G and F, and plows J J, in the manner herein specified, and for the purpose set forth.

ALEXANDER TURNER.
REDDEN BESS.
HERVEY SLOAN.

Witnesses:
JOHN K. ALEXANDER,
ROBERT A. ALEXANDER.